US006559743B2

(12) United States Patent
Narayanan et al.

(10) Patent No.: US 6,559,743 B2
(45) Date of Patent: May 6, 2003

(54) STORED ENERGY SYSTEM FOR BREAKER OPERATING MECHANISM

(75) Inventors: Janakiraman Narayanan, Hosur (IN); Mahesh Jaywant Rane, Bangalore (IN); ShachiDevi Tumkur Krishnamurthy, Bangalore (IN); Biranchi Narayana Sahu, Orissa (IN); Dantuluri Varma, Secunderabad (IN); Ramalingam Prem Anand, Chennai (IN); Tirumani Govinda Phaneendra, Bangalore Karnataka (IN); Satish Sahoo, Andhra Pradesh (IN)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/681,277

(22) Filed: Mar. 12, 2001

(65) Prior Publication Data

US 2001/0027959 A1 Oct. 11, 2001

Related U.S. Application Data

(63) Continuation-in-part of application No. 09/595,728, filed on Jun. 15, 2000.

(60) Provisional application No. 60/190,298, filed on Mar. 17, 2000, and provisional application No. 60/190,765, filed on Mar. 20, 2002.

(51) Int. Cl.[7] ........ H01M 3/00

(52) U.S. Cl. ........ 335/68; 335/172

(58) Field of Search ........ 335/68–70, 167–176; 200/400, 401

(56) References Cited

U.S. PATENT DOCUMENTS

| | | | |
|---|---|---|---|
| 2,340,682 | A | 2/1944 | Powell |
| 2,719,203 | A | 9/1955 | Gelzheiser et al. |
| 2,937,254 | A | 5/1960 | Ericson |
| 3,158,717 | A | 11/1964 | Jencks et al. |
| 3,162,739 | A | 12/1964 | Klein et al. |
| 3,197,582 | A | 7/1965 | Norden |
| 3,307,002 | A | 2/1967 | Cooper |
| 3,517,356 | A | 6/1970 | Hanafusa |
| 3,631,369 | A | 12/1971 | Menocal |
| 3,803,455 | A | 4/1974 | Willard |
| 3,883,781 | A | 5/1975 | Cotton |
| 4,129,762 | A | 12/1978 | Bruchet |
| 4,144,513 | A | 3/1979 | Shafer et al. |
| 4,152,561 | A | 5/1979 | Maier et al. |
| 4,158,119 | A | 6/1979 | Krakik |

(List continued on next page.)

FOREIGN PATENT DOCUMENTS

BE 819 008 A 12/1974

(List continued on next page.)

OTHER PUBLICATIONS

International Search Report, dated Nov. 13, 2001, corresponding to the International Application No. PCT/US 01/40312 and a copy of each of the publications cited therein.

(List continued on next page.)

*Primary Examiner*—Lincoln Donovan
(74) *Attorney, Agent, or Firm*—Cantor Colburn LLP

(57) ABSTRACT

An operating mechanism for a circuit breaker is provided. The operating mechanism includes a holder assembly being positioned to receive a portion of an operating handle of the circuit breaker. The holder assembly is capable of movement between a first position and a second position wherein the first position corresponds to a closed position of the circuit breaker and the second position corresponds to an open position of the circuit breaker. The operating mechanism further includes a drive plate being movably mounted to a support structure of the operating mechanism. The drive plate is coupled to the holder assembly. The operating mechanism also includes an energy storage mechanism for assuming a plurality of states, each state having a prescribed amount of energy stored in the energy storage mechanism. When the energy stored in the energy storage mechanism is released it provides an urging force to the drive plate causing the holder assembly to travel in the range defined by the first position to the second position.

23 Claims, 16 Drawing Sheets

U.S. PATENT DOCUMENTS

| | | | |
|---|---|---|---|
| 4,165,453 | A | 8/1979 | Hennemann |
| 4,166,988 | A | 9/1979 | Ciarcia et al. |
| 4,220,934 | A | 9/1980 | Wafer et al. |
| 4,255,732 | A | 3/1981 | Wafer et al. |
| 4,259,651 | A | 3/1981 | Yamat |
| 4,263,492 | A | 4/1981 | Maier et al. |
| 4,276,527 | A | 6/1981 | Gerbert-Gaillard et al. |
| 4,297,663 | A | 10/1981 | Seymour et al. |
| 4,301,342 | A | 11/1981 | Castonguay et al. |
| 4,336,516 | A | 6/1982 | Bratkowski et al. |
| 4,360,852 | A | 11/1982 | Gilmore |
| 4,368,444 | A | 1/1983 | Preuss et al. |
| 4,375,021 | A | 2/1983 | Pardini et al. |
| 4,375,022 | A | 2/1983 | Daussin et al. |
| 4,376,270 | A | 3/1983 | Staffen |
| 4,383,146 | A | 5/1983 | Bur |
| 4,392,036 | A | 7/1983 | Troebel et al. |
| 4,393,283 | A | 7/1983 | Masuda |
| 4,401,872 | A | 8/1983 | Boichot-Castagne et al. |
| 4,409,573 | A | 10/1983 | DiMarco et al. |
| 4,435,690 | A | 3/1984 | Link et al. |
| 4,467,297 | A | 8/1984 | Boichot-Castagne et al. |
| 4,468,645 | A | 8/1984 | Gerbert-Gaillard et al. |
| 4,470,027 | A | 9/1984 | Link et al. |
| 4,479,143 | A | 10/1984 | Watanabe et al. |
| 4,488,133 | A | 12/1984 | McClellan et al. |
| 4,492,941 | A | 1/1985 | Nagel |
| 4,541,032 | A | 9/1985 | Schwab |
| 4,546,224 | A | 10/1985 | Mostosi |
| 4,550,360 | A | 10/1985 | Dougherty |
| 4,562,419 | A | 12/1985 | Preuss et al. |
| 4,589,052 | A | 5/1986 | Dougherty |
| 4,595,812 | A | 6/1986 | Tamaru et al. |
| 4,611,187 | A | 9/1986 | Banfi |
| 4,612,430 | A | 9/1986 | Sloan et al. |
| 4,616,198 | A | 10/1986 | Pardini |
| 4,622,444 | A | 11/1986 | Kandatsu et al. |
| 4,631,625 | A | 12/1986 | Alexander et al. |
| 4,642,431 | A | 2/1987 | Tedesco et al. |
| 4,644,438 | A | 2/1987 | Puccinelli et al. |
| 4,649,247 | A | 3/1987 | Preuss et al. |
| 4,658,322 | A | 4/1987 | Rivera |
| 4,672,501 | A | 6/1987 | Bilac et al. |
| 4,675,481 | A | 6/1987 | Markowski et al. |
| 4,682,264 | A | 7/1987 | Demeyer |
| 4,689,712 | A | 8/1987 | Demeyer |
| 4,694,373 | A | 9/1987 | Demeyer |
| 4,710,845 | A | 12/1987 | Demeyer |
| 4,713,508 | A | 12/1987 | Baginski et al. |
| 4,717,985 | A | 1/1988 | Demeyer |
| 4,733,211 | A | 3/1988 | Castonguay et al. |
| 4,733,321 | A | 3/1988 | Lindeperg |
| 4,764,650 | A | 8/1988 | Bur et al. |
| 4,768,007 | A | 8/1988 | Mertz et al. |
| 4,780,786 | A | 10/1988 | Weynachter et al. |
| 4,831,221 | A | 5/1989 | Yu et al. |
| 4,870,531 | A | 9/1989 | Danek |
| 4,883,931 | A | 11/1989 | Batteux et al. |
| 4,884,047 | A | 11/1989 | Baginski et al. |
| 4,884,164 | A | 11/1989 | Dziura et al. |
| 4,900,882 | A | 2/1990 | Bernard et al. |
| 4,910,485 | A | 3/1990 | Bolongeat-Mobleu et al. |
| 4,914,541 | A | 4/1990 | Tripodi et al. |
| 4,916,420 | A | 4/1990 | Bartolo et al. |
| 4,916,421 | A | 4/1990 | Pardini et al. |
| 4,926,282 | A | 5/1990 | McGhie |
| 4,935,590 | A | 6/1990 | Malkin et al. |
| 4,937,706 | A | 6/1990 | Schueller et al. |
| 4,939,492 | A | 7/1990 | Raso et al. |
| 4,943,691 | A | 7/1990 | Mertz et al. |
| 4,943,888 | A | 7/1990 | Jacob et al. |
| 4,950,855 | A | 8/1990 | Bolonegeat-Mobleu et al. |
| 4,951,019 | A | 8/1990 | Gula |
| 4,952,897 | A | 8/1990 | Barnel et al. |
| 4,958,135 | A | 9/1990 | Baginski et al. |
| 4,965,543 | A | 10/1990 | Batteux |
| 4,983,788 | A | 1/1991 | Pardini |
| 5,001,313 | A | 3/1991 | Leclerq et al. |
| 5,004,878 | A | 4/1991 | Seymour et al. |
| 5,029,301 | A | 7/1991 | Nebon et al. |
| 5,030,804 | A | 7/1991 | Abri |
| 5,057,655 | A | 10/1991 | Kersusan et al. |
| 5,077,627 | A | 12/1991 | Fraisse |
| 5,083,081 | A | 1/1992 | Barrault et al. |
| 5,095,183 | A | 3/1992 | Raphard et al. |
| 5,103,198 | A | 4/1992 | Morel et al. |
| 5,115,371 | A | 5/1992 | Tripodi |
| 5,120,921 | A | 6/1992 | DiMarco et al. |
| 5,132,865 | A | 7/1992 | Mertz et al. |
| 5,138,121 | A | 8/1992 | Streich et al. |
| 5,140,115 | A | 8/1992 | Morris |
| 5,153,802 | A | 10/1992 | Mertz et al. |
| 5,155,315 | A | 10/1992 | Malkin et al. |
| 5,166,483 | A | 11/1992 | Kersusan et al. |
| 5,172,087 | A | 12/1992 | Castonguay et al. |
| 5,178,504 | A | 1/1993 | Falchi |
| 5,184,717 | A | 2/1993 | Chou et al. |
| 5,187,339 | A | 2/1993 | Lissandrin |
| 5,198,956 | A | 3/1993 | Dvorak |
| 5,200,724 | A | 4/1993 | Gula et al. |
| 5,210,385 | A | 5/1993 | Morel et al. |
| 5,239,150 | A | 8/1993 | Bolongeat-Mobleu et al. |
| 5,260,533 | A | 11/1993 | Livesey et al. |
| 5,262,744 | A | 11/1993 | Arnold et al. |
| 5,280,144 | A | 1/1994 | Bolongeat-Mobleu et al. |
| 5,281,776 | A | 1/1994 | Morel et al. |
| 5,296,660 | A | 3/1994 | Morel et al. |
| 5,296,664 | A | 3/1994 | Crookston et al. |
| 5,298,874 | A | 3/1994 | Morel et al. |
| 5,300,907 | A | 4/1994 | Nereau et al. |
| 5,310,971 | A | 5/1994 | Vial et al. |
| 5,313,180 | A | 5/1994 | Vial et al. |
| 5,317,471 | A | 5/1994 | Izoard et al. |
| 5,331,500 | A | 7/1994 | Corcoles et al. |
| 5,334,808 | A | 8/1994 | Bur et al. |
| 5,341,191 | A | 8/1994 | Crookston et al. |
| 5,347,096 | A | 9/1994 | Bolongeat-Mobleu et al. |
| 5,347,097 | A | 9/1994 | Bolongeat-Mobleu et al. |
| 5,350,892 | A | 9/1994 | Rozier |
| 5,357,066 | A | 10/1994 | Morel et al. |
| 5,357,068 | A | 10/1994 | Rozier |
| 5,357,394 | A | 10/1994 | Piney |
| 5,361,052 | A | 11/1994 | Ferullo et al. |
| 5,373,130 | A | 12/1994 | Barrault et al. |
| 5,379,013 | A | 1/1995 | Coudert |
| 5,424,701 | A | 6/1995 | Castonguary et al. |
| 5,438,176 | A | 8/1995 | Bonnardel et al. |
| 5,440,088 | A | 8/1995 | Coudert et al. |
| 5,449,871 | A | 9/1995 | Batteux et al. |
| 5,450,048 | A | 9/1995 | Leger et al. |
| 5,451,729 | A | 9/1995 | Onderka et al. |
| 5,457,295 | A | 10/1995 | Tanibe et al. |
| 5,467,069 | A | 11/1995 | Payet-Burin et al. |
| 5,469,121 | A | 11/1995 | Payet-Burin |
| 5,475,558 | A | 12/1995 | Barjonnet et al. |
| 5,477,016 | A | 12/1995 | Baginski et al. |
| 5,479,143 | A | 12/1995 | Payet-Burin |
| 5,483,212 | A | 1/1996 | Lankuttis et al. |
| 5,485,343 | A | 1/1996 | Santos et al. |
| D367,265 | S | 2/1996 | Yamagata et al. |
| 5,493,083 | A | 2/1996 | Olivier |

| | | | | | |
|---|---|---|---|---|---|
| 5,504,284 | A | | 4/1996 | Lazareth et al. | |
| 5,504,290 | A | | 4/1996 | Baginski et al. | |
| 5,510,761 | A | | 4/1996 | Boder et al. | |
| 5,512,720 | A | | 4/1996 | Coudert et al. | |
| 5,515,018 | A | | 5/1996 | DiMarco et al. | |
| 5,519,561 | A | | 5/1996 | Mrenna et al. | |
| 5,534,674 | A | | 7/1996 | Steffens | |
| 5,534,832 | A | | 7/1996 | Duchemin et al. | |
| 5,534,835 | A | | 7/1996 | McColloch et al. | |
| 5,534,840 | A | | 7/1996 | Cuingnet | |
| 5,539,168 | A | | 7/1996 | Linzenich | |
| 5,543,595 | A | | 8/1996 | Mader et al. | |
| 5,545,867 | A | | 8/1996 | Castonguay et al. | |
| 5,552,755 | A | | 9/1996 | Fello et al. | |
| 5,571,255 | A | | 11/1996 | Baginski et al. | |
| 5,581,219 | A | | 12/1996 | Nozawa et al. | |
| 5,604,656 | A | | 2/1997 | Derrick et al. | |
| 5,608,367 | A | | 3/1997 | Zoller et al. | |
| 5,784,233 | A | | 7/1998 | Bastard et al. | |
| 6,015,959 | A | * | 1/2000 | Slepian et al. | 200/400 |

FOREIGN PATENT DOCUMENTS

| | | |
|---|---|---|
| DE | 12 27 978 | 11/1966 |
| DE | 30 47 360 | 6/1982 |
| DE | 38 02 184 | 8/1989 |
| DE | 38 43 277 | 6/1990 |
| DE | 44 19 240 | 1/1995 |
| EP | 0 061 092 | 9/1982 |
| EP | 0 064 906 | 11/1982 |
| EP | 0 066 486 | 12/1982 |
| EP | 0 076 719 | 4/1983 |
| EP | 0 117 094 | 8/1984 |
| EP | 0 140 761 | 5/1985 |
| EP | 0 174 904 | 3/1986 |
| EP | 0 196 241 | 10/1986 |
| EP | 0 224 396 | 6/1987 |
| EP | 0 235 479 | 9/1987 |
| EP | 0 239 460 | 9/1987 |
| EP | 0 258 090 | 3/1988 |
| EP | 0 264 313 | 4/1988 |
| EP | 0 264 314 | 4/1988 |
| EP | 0 296 631 A2 | 6/1988 |
| EP | 0 283 189 | 9/1988 |
| EP | 0 283 358 | 9/1988 |
| EP | 0 291 374 | 11/1988 |
| EP | 0 295 155 | 12/1988 |
| EP | 0 295 158 | 12/1988 |
| EP | 0 309 923 | 4/1989 |
| EP | 0 313 106 | 4/1989 |
| EP | 0 313 422 | 4/1989 |
| EP | 0 314 540 | 5/1989 |
| EP | 0 331 586 | 9/1989 |
| EP | 0 337 900 | 10/1989 |
| EP | 0 342 133 | 11/1989 |
| EP | 0 367 690 | 5/1990 |
| EP | 0 371 887 | 6/1990 |
| EP | 0 375 568 | 6/1990 |
| EP | 0 394 144 | 10/1990 |
| EP | 0 394 922 | 10/1990 |
| EP | 0 399 282 | 11/1990 |
| EP | 0 407 310 | 1/1991 |
| EP | 0 452 230 | 10/1991 |
| EP | 0 555 158 | 8/1993 |
| EP | 0 560 697 | 9/1993 |
| EP | 0 567 416 | 10/1993 |
| EP | 0 595 730 | 5/1994 |
| EP | 0 619 591 | 10/1994 |
| EP | 0 665 569 | 8/1995 |
| EP | 0 700 140 | 3/1996 |
| EP | 0 889 498 | 1/1999 |
| FR | 2 410 353 | 6/1979 |
| FR | 2 512 582 | 3/1983 |
| FR | 2 553 943 | 4/1985 |
| FR | 2 592 998 | 7/1987 |
| FR | 2 682 531 | 4/1993 |
| FR | 2 697 670 | 5/1994 |
| FR | 2 699 324 | 6/1994 |
| FR | 2 714 771 | 7/1995 |
| GB | 2 233 155 | 1/1991 |
| WO | 92/00598 | 1/1992 |
| WO | 92/05649 | 4/1992 |
| WO | 94/00901 | 1/1994 |

OTHER PUBLICATIONS

International Search Report, Dated Oct. 29, 2001, corresponding to the International Application No. PCT/US 01/08850 and a copy of each of the publications cited therein.

* cited by examiner

STORED ENERGY SYSTEM FOR BREAKER OPERATING MECHANISM

CROSS REFERENCE TO RELATED APPLICATIONS

This application claims benefit of Provisional Application No. 60/190,298 filed on Mar. 17, 2000, and Provisional Application No. 60/190,765 filed on Mar. 20, 2002, the contents of which are incorporated herein by reference thereto.

This application is a continuation-in-part of U.S. application Ser. No. 09/595,728 filed on Jun. 15, 2000, the contents of which are incorporated herein by reference thereto.

BACKGROUND OF INVENTION

This invention relates to a method and apparatus for storing energy in a circuit breaker.

Electric circuit breakers are generally used to disengage an electrical system under certain operating conditions. Therefore, it is required to provide a mechanism whereby a quantum of stored energy, utilized in opening, closing and resetting the circuit breaker after trip, is capable of being conveniently adjusted with a minimum of effort and without additional or special tools, in the field or in the manufacturing process. Conventional systems use a portion of stored energy to close the circuit breaker or circuit interrupter mechanism. This energy is wasted in overcoming resistance presented by components used in charging systems.

It is desired to provide a mechanism that minimizes the stored energy required for opening, closing, and resetting the breaker mechanism, as well as reducing the operational time to achieve quick closing of breaker (within 50 ms), using minimum signal power and with high reliability, thus optimizing the mechanism size, and cost.

SUMMARY OF INVENTION

An operating mechanism for a circuit breaker is provided. The operating mechanism includes a holder assembly being configured, dimensioned and positioned to receive a portion of an operating handle of the circuit breaker where the holder assembly is capable of movement between a first position and a second position wherein the first position corresponds to a closed position of the handle and the second position corresponds to an open position of the handle.

The operating mechanism further includes a drive plate being movably mounted to a support structure of the operating mechanism where the drive plate is being coupled to the holder assembly. The operating mechanism also includes an energy storage mechanism for assuming a plurality of states, each state having a prescribed amount of energy stored in the energy storage mechanism, the energy storage mechanism providing an urging force to the drive plate when the holder assembly is in the second position and the urging force causing the holder assembly to travel from the first position to the second position.

DETAILED DESCRIPTION

Figure 1:
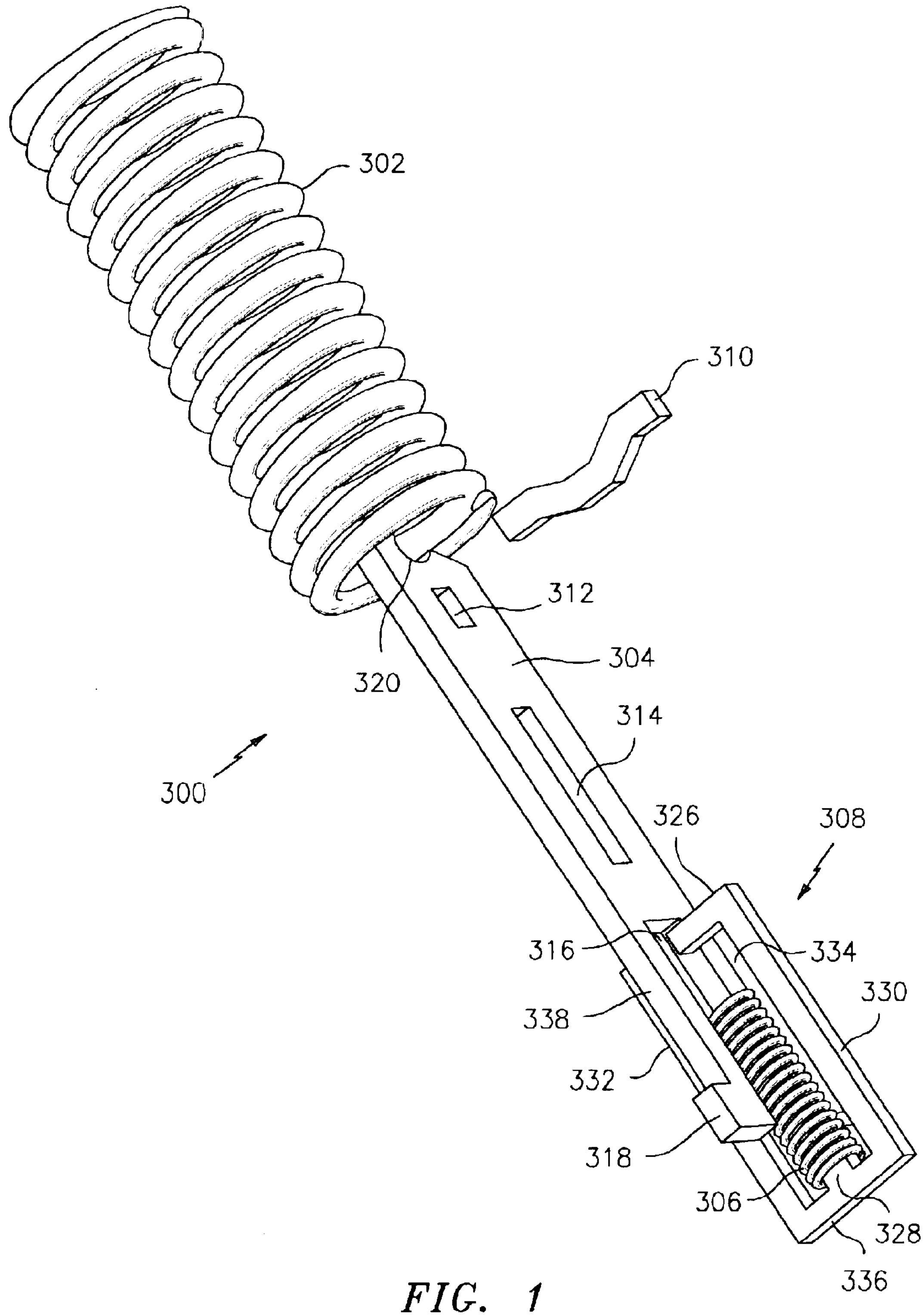
FIG. 1 is an exploded three-dimensional view of the energy storage mechanism of the present invention.
Figure 2:
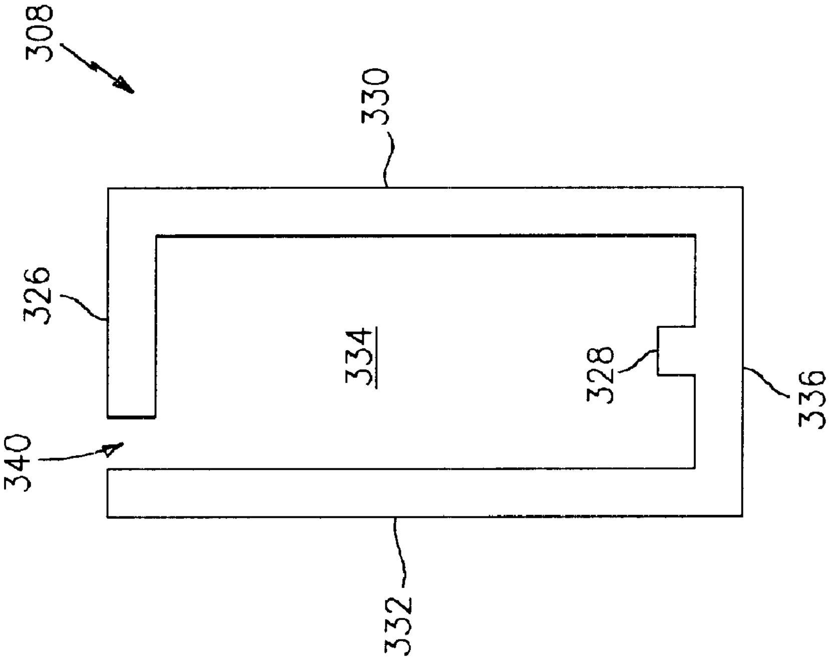
FIG. 2 is a view of the auxiliary spring guide of the energy storage mechanism of FIG. 1.

Referring to FIG. 1, an energy storage mechanism is shown generally at 300. Energy storage mechanism 300 comprises a main spring guide 304 (seen also in FIG. 3), a generally flat, bar-like fixture having a first closed slot 312 and a second closed slot 314 therein. Main spring guide 304 includes a semi-circular receptacle 320 at one end thereof and an open slot 316 at the opposing end. Main spring guide 304 includes a pair of flanges 318 extending outward a distance "h" (FIG. 3) from a pair of fork-like members 338 at the end of main spring guide 304 containing open slot 316. Fork-like members 338 are generally in the plane of main spring guide 304. Energy storage mechanism 300 further comprises an auxiliary spring guide 308. Auxiliary spring guide 308 (seen also in FIG. 2) is a generally flat fixture having a first frame member 330 and a second frame member 332 generally parallel to one another and joined by way of a base member 336. A beam member 326 extends generally perpendicular from first frame member 330 in the plane of auxiliary spring guide 308 nearly to second frame member 332 so as to create a clearance 340 (as seen in FIG. 2) between the end of beam member 326 and second frame member 332. Clearance 340 (as seen in FIG. 2) allows beam member 326, and thus auxiliary spring guide 308, to engage main spring guide 304 at second closed slot 314. Beam member 326, first frame member 330, second frame member 332 and base member 336 are placed into an aperture 334.

A tongue 328 extends from base member 336 into aperture 334. Tongue 328 is operative to receive an auxiliary spring 306, having a spring constant of $k_a$. whereby auxiliary spring 306 is retained within aperture 334. The combination of auxiliary spring 306, retained within aperture 334, and auxiliary spring guide 308 is coupled to main spring guide 304 in such a manner that beam member 326 is engaged with, and allowed to move along the length of second closed slot 314. Auxiliary spring guide 308 is thereby allowed to move relative to main spring guide 304 by the application of a force to base member 336 of auxiliary spring guide 308. Auxiliary spring 306 is thus retained simultaneously within open slot 316 by fork-like members 338 and in aperture 334 by first frame member 330 and second frame member 332.

Figure 3:
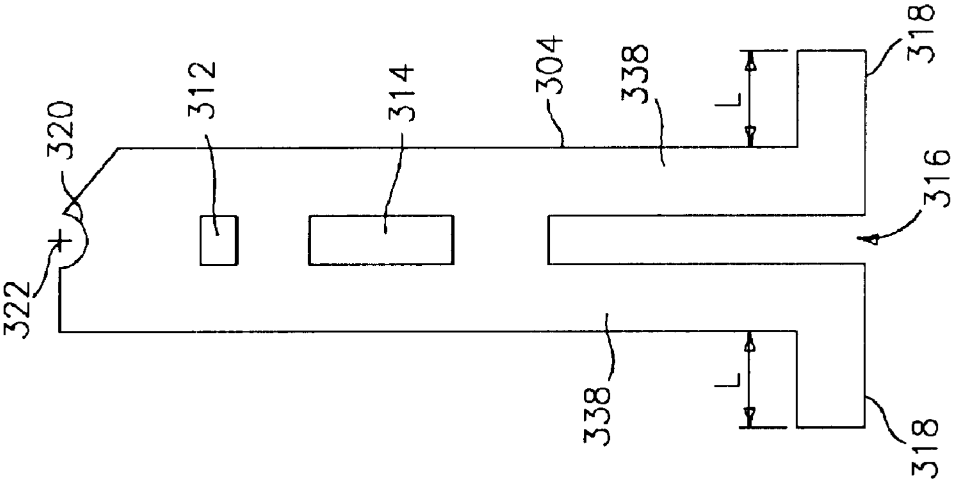
FIG. 3 is a view of the main spring guide of the energy storage mechanism of FIG. 1.
Figure 4:
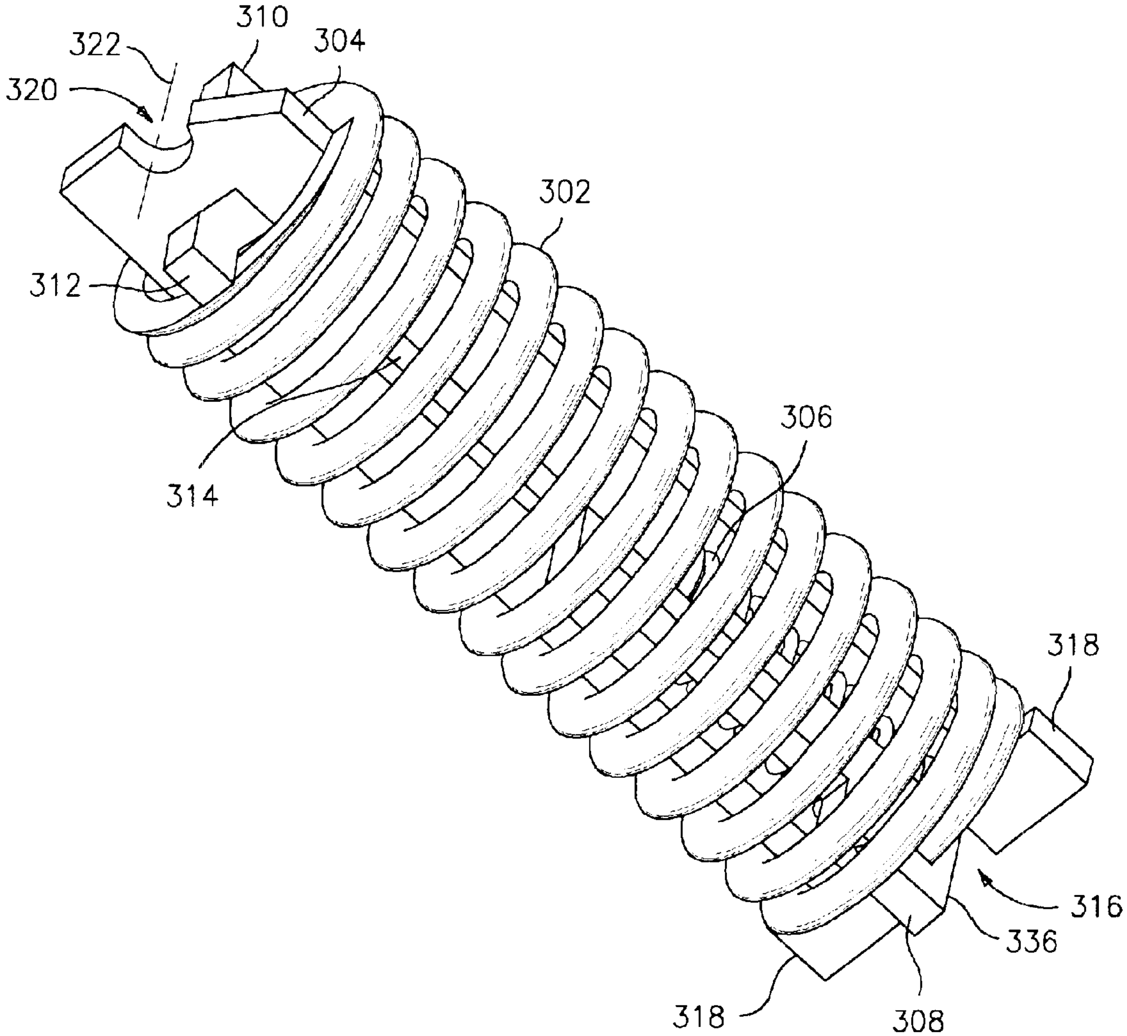
FIG. 4 is a view of the assembled energy storage mechanism of FIG. 1.

Energy storage mechanism 300 further comprises a main spring 302 having a spring constant $k_m$. Main spring guide 304, along with auxiliary spring guide 308 and auxiliary spring 306 engaged thereto, is positioned within the interior part of main spring 302 such that one end of main spring 302 abuts flanges 318. A locking pin 310 (FIG. 7) is passed through first closed slot 312 such that the opposing end of main spring 302 abuts locking pin 310 so as to capture and lock main spring 302 between locking pin 310 and flanges 318. As seen in FIG. 4, the assembled arrangement of main spring 302, main spring guide 304, auxiliary spring 306, auxiliary spring guide 308 and locking pin 310 form a cooperative mechanical unit. In the interest of clarity in the description of energy storage mechanism 300 in FIGS. 1 and 4, reference is made to FIGS. 2 and 3 showing auxiliary spring guide 308 and the main spring guide 304 respectively.

Figure 5:
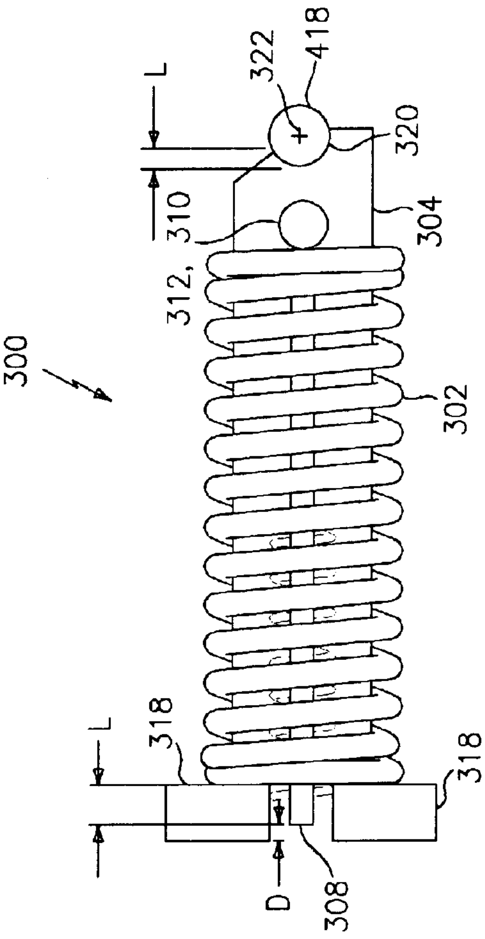
FIG. 5 is a view of the assembled energy storage mechanism of FIG. 1 showing the movement of the auxiliary spring guide relative to the main spring guide and the assembled energy storage mechanism engaged to a side plate pin.
Figure 6:
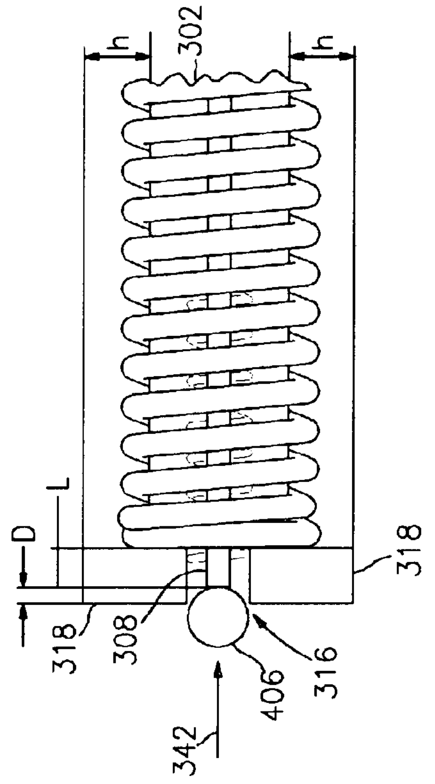
FIG. 6 is a more detailed view of a segment of the assembled energy storage mechanism of FIG. 5 showing the assembled energy storage mechanism engaged to a drive plate pin.

Reference is now made to FIGS. 5 and 6. FIG. 5 depicts the assembled energy storage mechanism 300. A side plate pin 418, affixed to a side plate (not shown), is retained within receptacle 320 so as to allow energy storage mechanism 300 to rotate about a spring assembly axis 322. In FIG. 6, a drive plate pin 406, affixed to a drive plate (not shown), is retained against auxiliary spring guide 308 and between fork-like members 338 in the end of main spring guide 304 containing open slot 316. Drive plate pin 406 is so retained in open slot 316 at an initial displacement "D" with respect to the ends of flanges 318. Thus, as seen in FIGS. 5 and 6, the assembled energy storage mechanism 300 is captured between side plate pin 418, drive plate pin 406, receptacle 320 and open slot 316.

Energy storage mechanism 300 is held firmly therebetween due to the force of auxiliary spring 306 acting against auxiliary spring guide 308, against drive plate pin 406, against main spring guide 304 and against side plate pin 418. As seen in FIG. 5, auxiliary spring guide 308 is operative to move independent of main spring 302 over a distance "L" relative to main spring guide 304 by the application of a force acting along a line 342 in FIG. 6. When auxiliary spring guide 308 has traversed the distance "L," side plate pin 418 comes clear of receptacle 320 and energy storage mechanism 300 may be disengaged from side plate pin 418 and drive plate pin 406.

As best understood from FIGS. 5 and 6, the spring constant, $k_{a,}$ for auxiliary spring 306 is sufficient to firmly retain the assembled energy storage mechanism 300 between side plate pin 418 and drive plate pin 406, but also such that only a minimal amount of effort is required to compress auxiliary spring 306 and allow auxiliary spring guide 308 to move the distance "L." This allows energy storage mechanism 300 to be easily removed by hand from between side plate pin 418 and drive plate pin 406.

Figure 7:
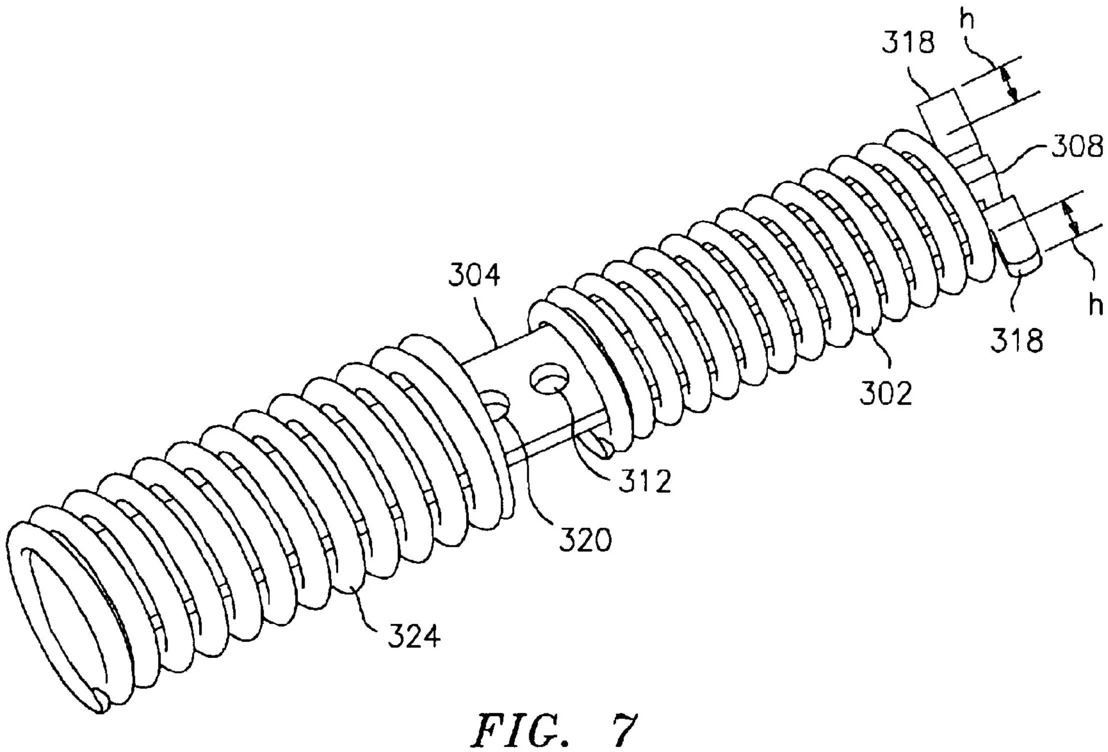
FIG. 7 is a three dimensional view of the energy storage mechanism of FIG. 1 including a second spring, coaxial with the main spring of FIG. 1.

Referring now to FIG. 7, a coaxial spring 324, having a spring constant $k_c$ and aligned coaxially with main spring 302, is shown. Coaxial spring 324 may be engaged to main spring guide 304 between flanges 318 and locking pin 310 (not shown) in the same manner depicted in FIG. 4 for main spring 302, thus providing energy storage mechanism 300 with a total spring constant of $k_T=k_m+k_c$. Flanges 318 extend a distance "h" sufficient to accommodate main spring 302 and coaxial spring 324. Thus, energy storage mechanism 300 of the present invention is a modular unit that can be easily removed and replaced in the field or in the factory with a new or additional main spring 302. This allows for varying the amount of energy that can be stored in energy storage mechanism 300 without the need for special or additional tools.

Referring now to FIGS. 9–14, a circuit breaker (MCCB) is shown generally at 100. Circuit breaker 100 includes a circuit breaker handle 102 extending therefrom is coupled to a set of circuit breaker contacts (not shown). The components of the circuit breaker motor operator of the present invention are shown in FIGS. 9–14 generally at 200. Motor operator 200 generally comprises a holder, such as a carriage 202 coupled to circuit breaker handle 102, energy storage mechanism 300, as described above, and a mechanical linkage system 400.

Figure 24:
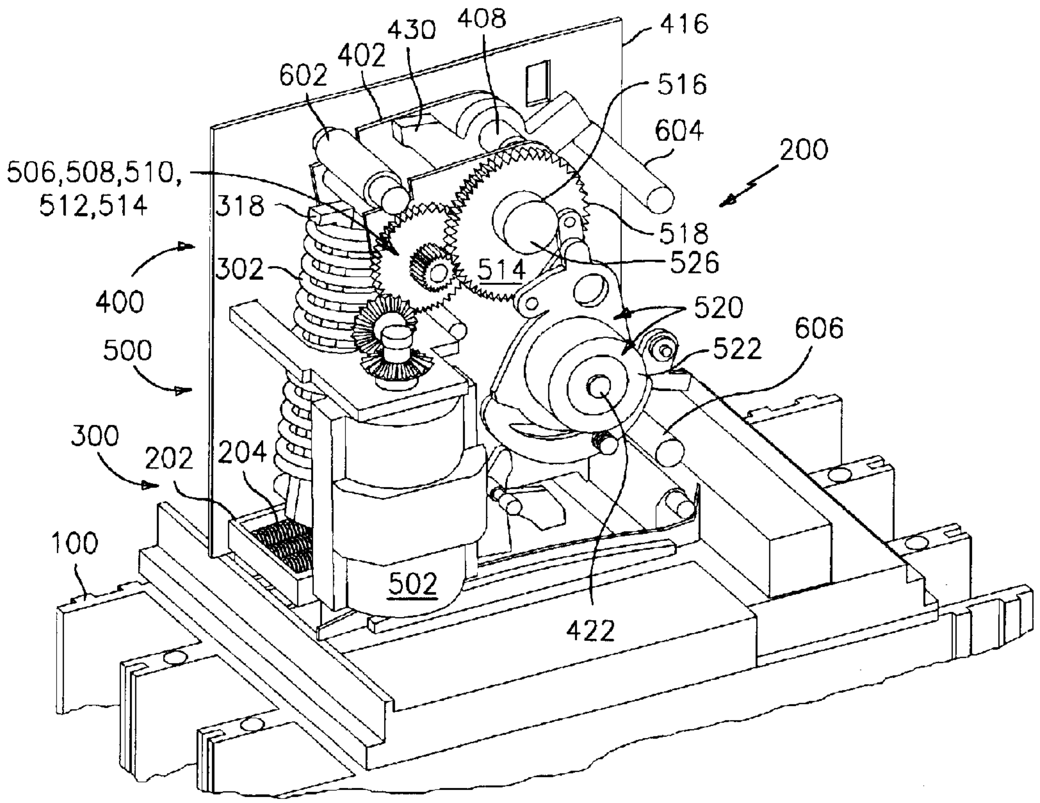
FIG. 24 is a three dimensional view of the circuit breaker motor operator of FIG. 9, excluding a side plate.

Mechanical linkage system 400 is connected to energy storage mechanism 300, carriage 202 and a motor drive assembly 500 (FIG. 24). Carriage 202, energy storage mechanism 300 and mechanical linkage system 400 act as a cooperative mechanical unit responsive to the action of motor drive assembly 500 and circuit breaker handle 102 to assume a plurality of configurations. In particular, the action of motor operator 200 is operative to disengage or reengage the set of circuit breaker contacts coupled to circuit breaker handle 102. Disengagement (i.e., opening) of the set of circuit breaker contacts interrupts the flow of electrical current through circuit breaker 100. Reengagement (i.e., closing) of the circuit breaker contacts allows electrical current to flow through the circuit breaker 100.

Figure 8:
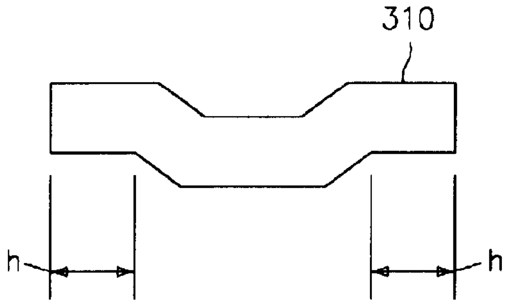
FIG. 8 is a view of the locking member of the energy storage mechanism of FIG. 1.
Figure 15:
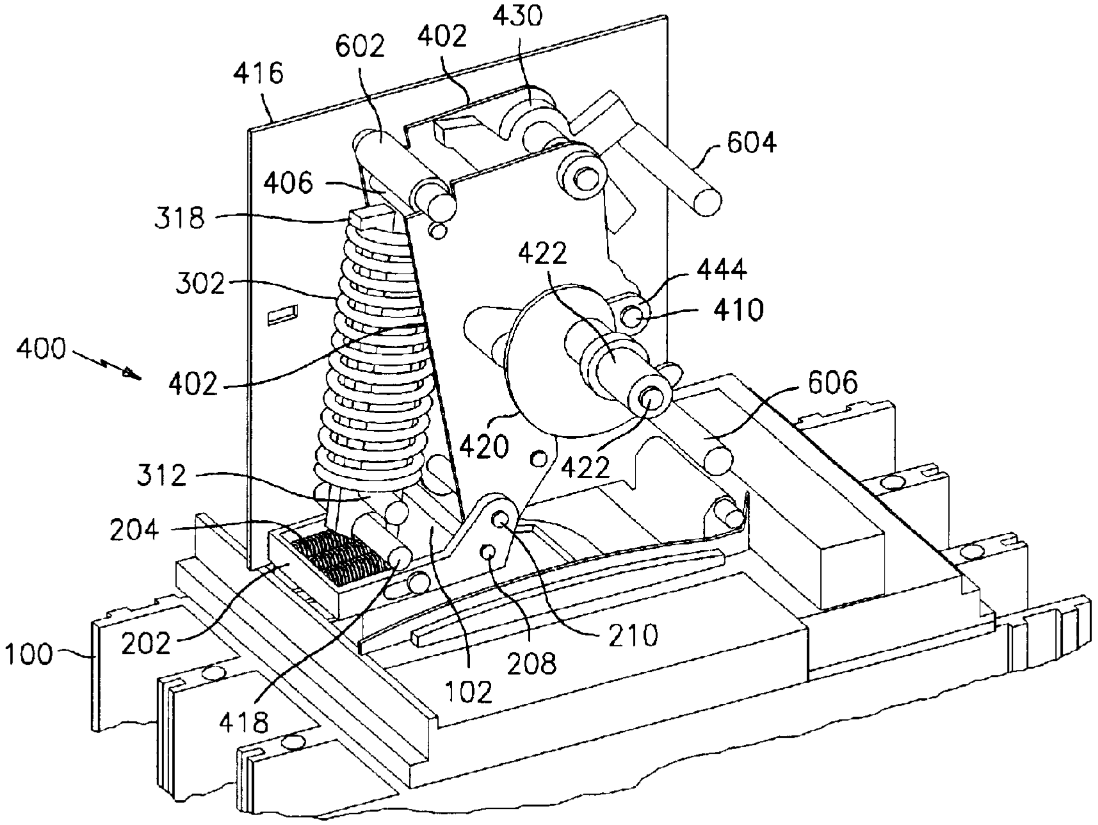
FIG. 15 is a second three dimensional view of the circuit breaker motor operator of FIG. 9.
Figure 16:
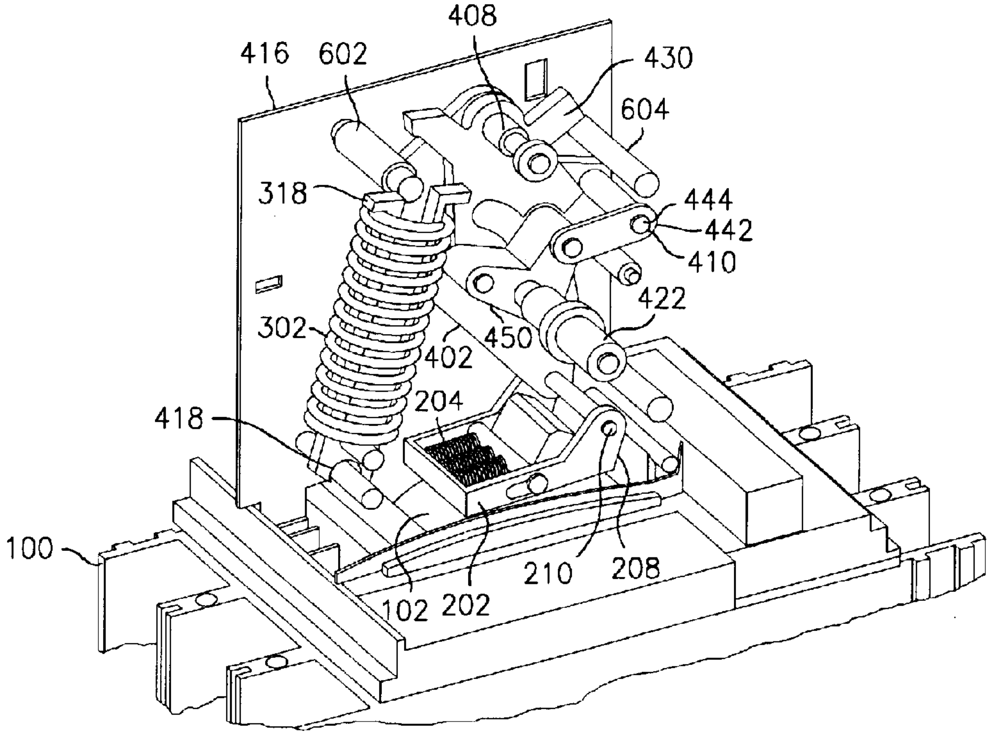
FIG. 16 is a third three dimensional view of the circuit breaker motor operator of FIG. 9.
Figure 17:
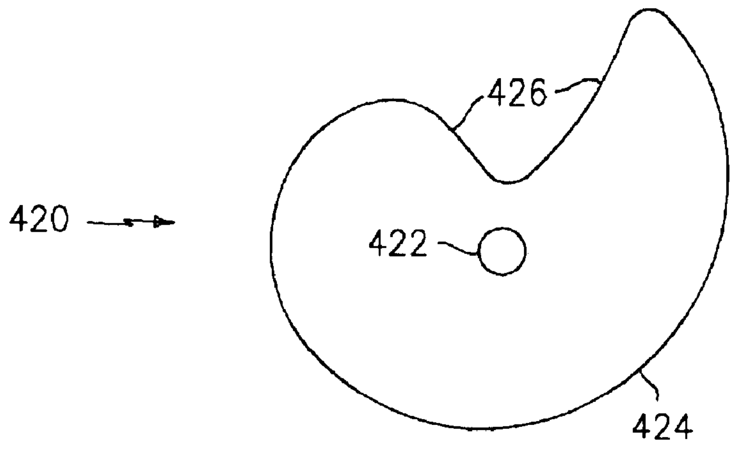
FIG. 17 is a view of the cam of the circuit breaker motor operator of FIG. 9.
Figure 18:
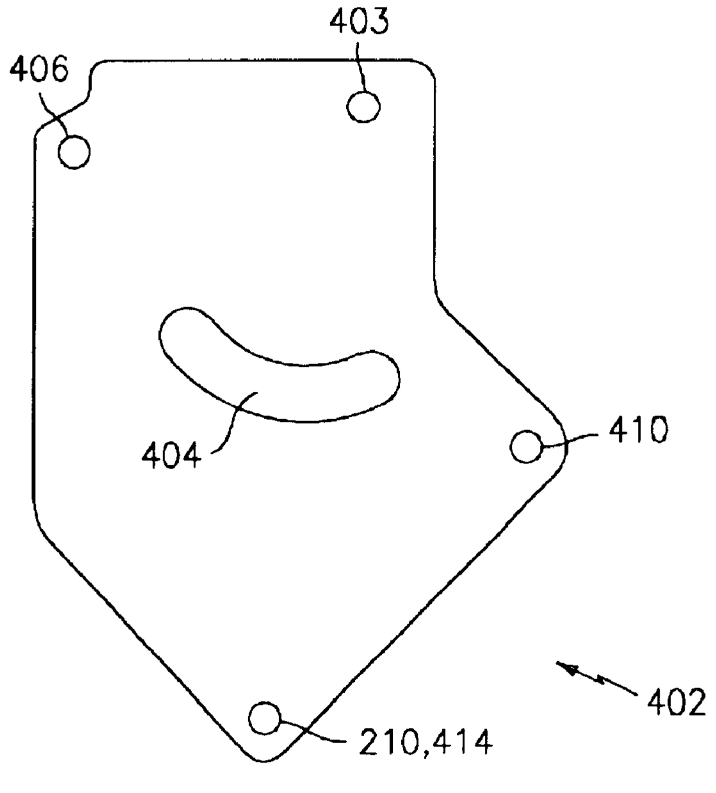
FIG. 18 is a view of the drive plate of the circuit breaker motor operator of FIG. 9.
Figure 19:
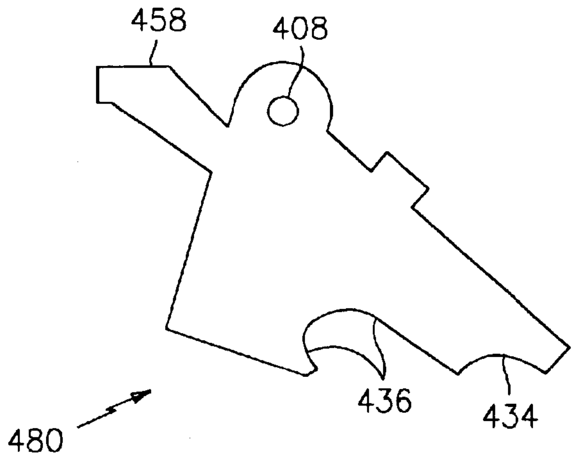
FIG. 19 is a view of the latch plate of the circuit breaker motor operator of FIG. 9.

Referring to FIG. 8, in conjunction with FIGS. 15, 16 and 17, mechanical linkage system 400 comprises a pair of side plates 416 held substantially parallel to one another by a set of braces 602, 604 and connected to circuit breaker 100. A pair of drive plates 402 (FIG. 18) are positioned interior, and substantially parallel to the pair of side plates 416. Drive plates 402 are connected to one another by way of, and are rotatable about, a drive plate axis 408. Drive plate axis 408 is connected to the pair of side plates 416. The pair of drive plates 402 include a drive plate pin 406 connected therebetween and engaged to energy storage mechanism 300 at open slot 316 of main spring guide 304. A connecting rod 414 connects the pair of drive plates 402 and is rotatably connected to carriage 202 at axis 210.

A cam 420, rotatable on a cam shaft 422, includes a first cam surface 424 and a second cam surface 426 (FIG. 17). Cam 420 is, in general, of a nautilus shape wherein second cam surface 426 is a concavely arced surface and first cam surface 424 is a convexly arced surface. Cam shaft 422 passes through a slot 404 in each of the pair of drive plates 402 and is supported by the pair of side plates 416. Mechanical linkage system 400 minimizes the stored energy required for closing the breaker mechanism and reduces the closing time, thereby optimizing the mechanism size and cost. Cam shaft 422 is further connected to motor drive assembly 500 (FIGS. 24 and 25) from which cam 420 is driven in rotation.

Carriage 202 is connected to drive plate 402 by way of the connecting rod 414 of axis 210 and is rotatable thereabout. Carriage 202 comprises a set of retaining springs 204, a first retaining bar 206 and a second retaining bar 208. Retaining springs 204, disposed within carriage 202 and acting against first retaining bar 206, retain circuit breaker handle 102 firmly between first retaining bar 206 and second retaining bar 208. Carriage 202 is allowed to move laterally with respect to side plates 416 by way of first retaining bar 206 coupled to a slot 214 in each of side plates 416. Carriage 202 moves back and forth along slots 214 to toggle circuit breaker handle 102 back and forth between the position of FIG. 9 and that of FIG. 13.

Figure 9:
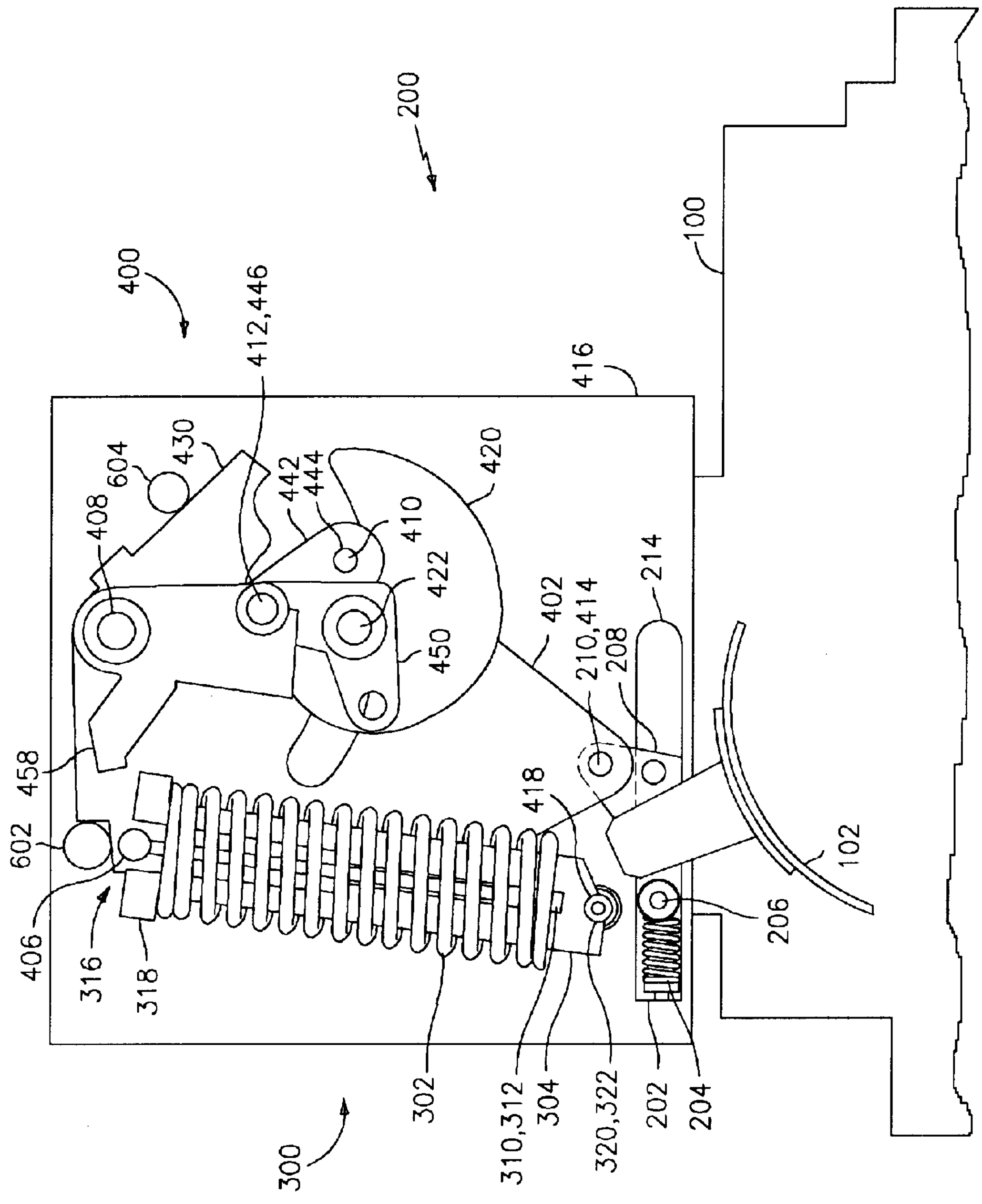
FIG. 9 is a side view of the circuit breaker motor operator of the present invention in the CLOSED position.

In FIG. 9, circuit breaker 100 is in the closed position (i.e., electrical contacts closed) and no energy is stored in main spring 302. Motor operator 200 operates to move circuit breaker handle 102 between the closed position of FIG. 9 and the open position (i.e., electrical contacts open) of FIG. 13. In addition, when circuit breaker 100 trips due for example to an overcurrent condition in an associated electrical system, motor operator 200 operates to reset an operating mechanism (not shown) within circuit breaker 100 by moving the handle to the open position of FIG. 13.

Figure 10:
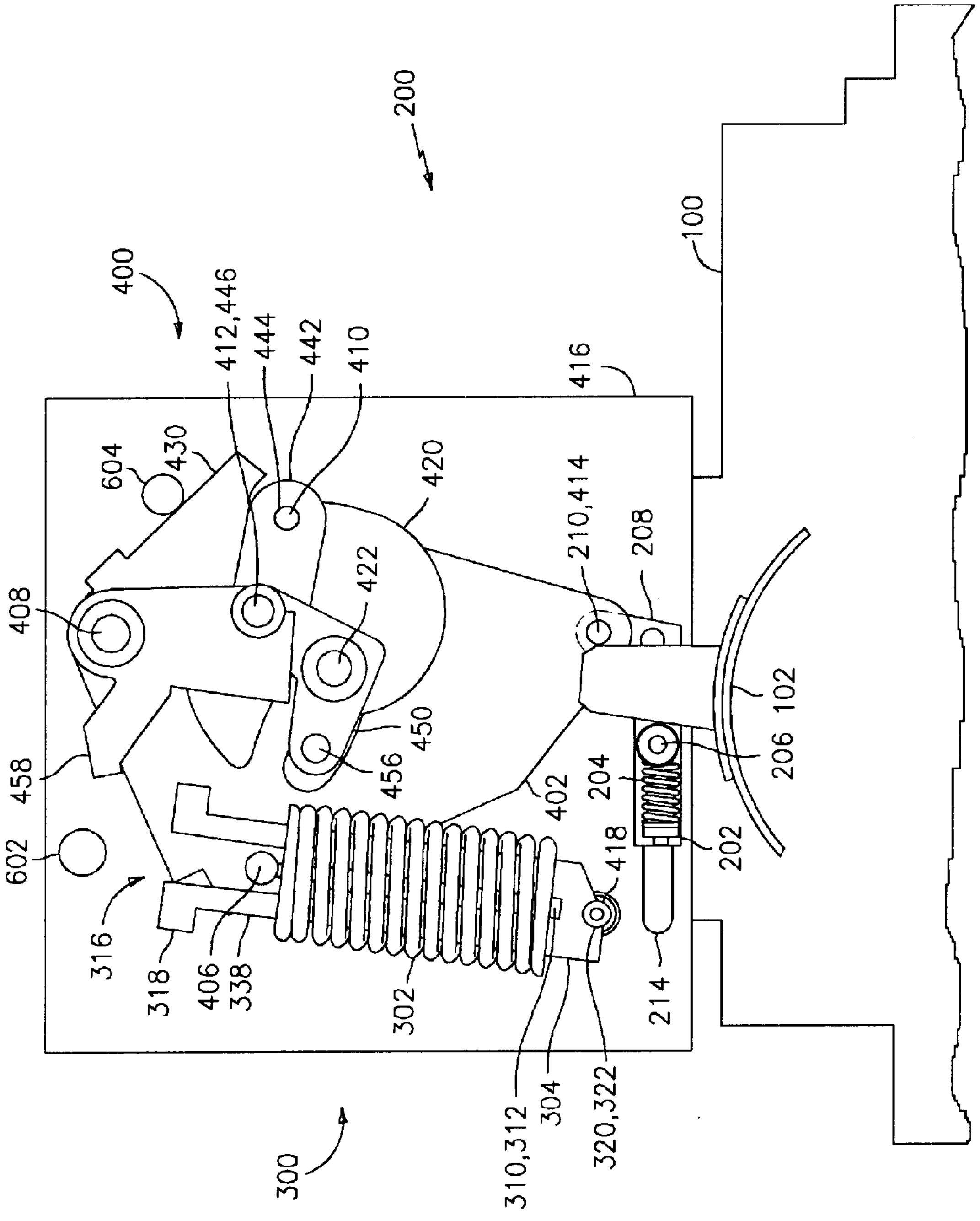
FIG. 10 is a side view of the circuit breaker motor operator of FIG. 9 passing from the closed position of FIG. 9 to the OPEN position.
Figure 11:
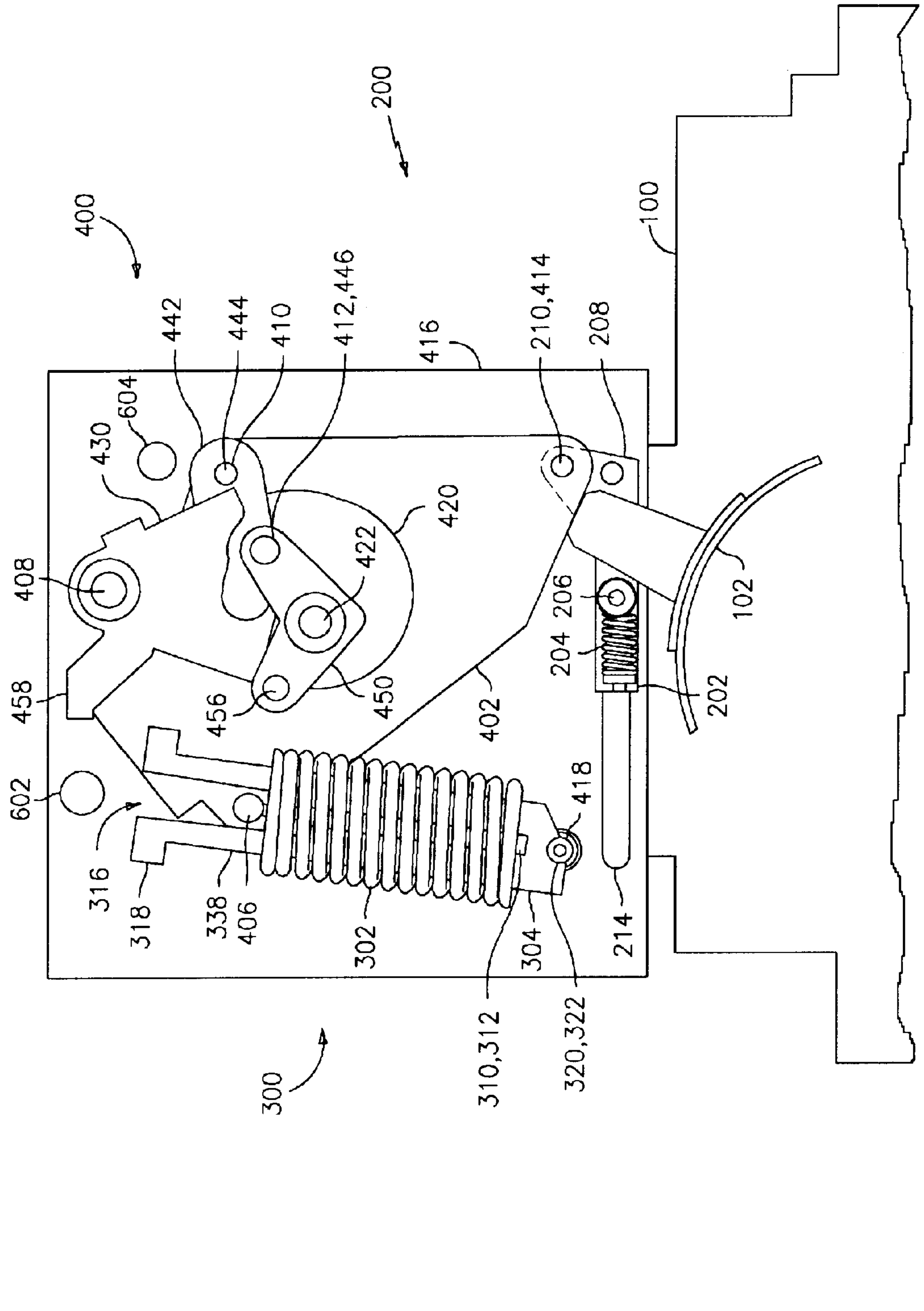
FIG. 11 is a side view of the circuit breaker motor operator of FIG. 9 passing from the closed position of FIG. 9 to the OPEN position.
Figure 12:
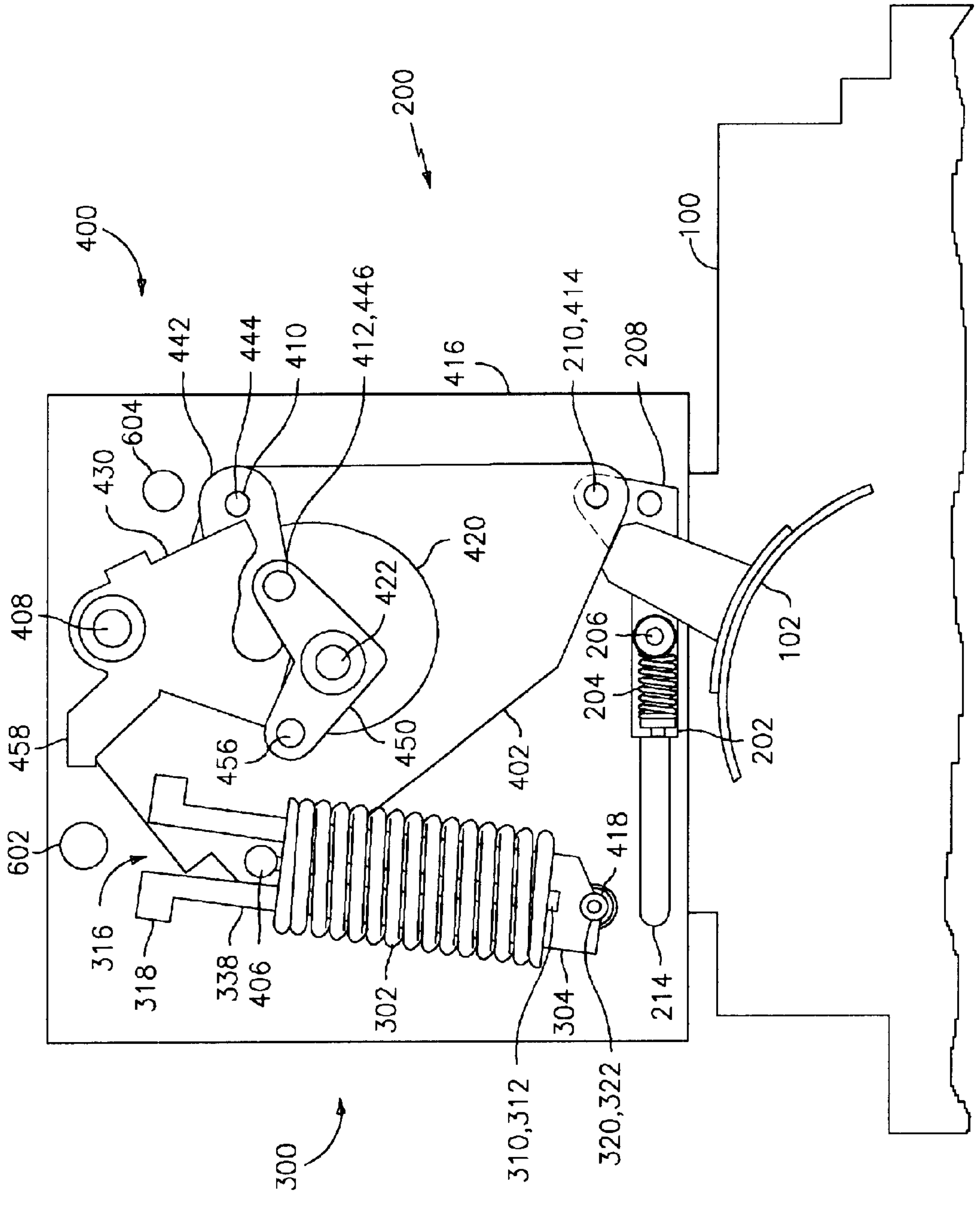
FIG. 12 is a side view of the circuit breaker motor operator of FIG. 9 passing from the closed position of FIG. 9 to the OPEN position.
Figure 13:
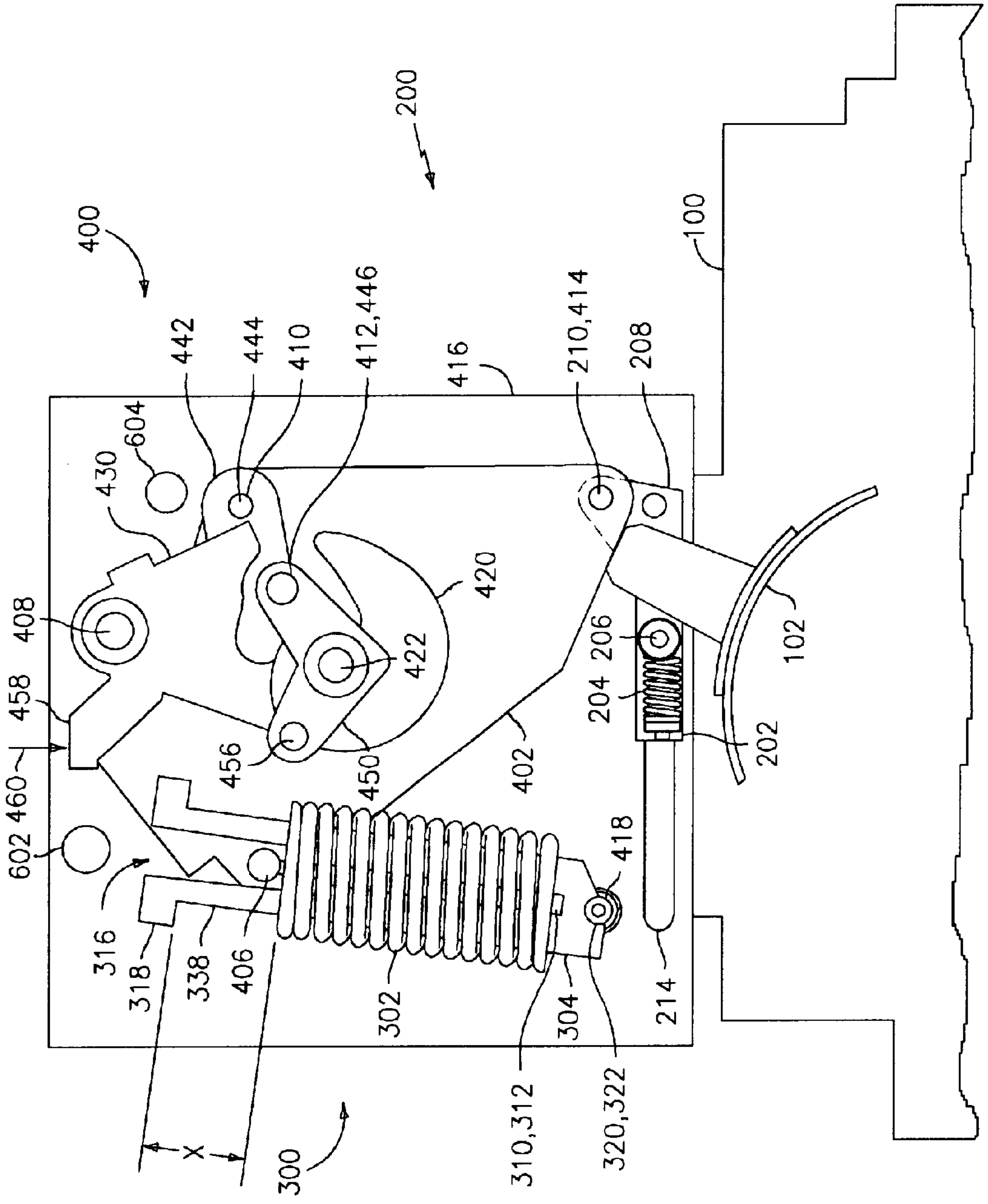
FIG. 13 is a side view of the circuit breaker motor operator of FIG. 9 in the OPEN position.
Figure 14:
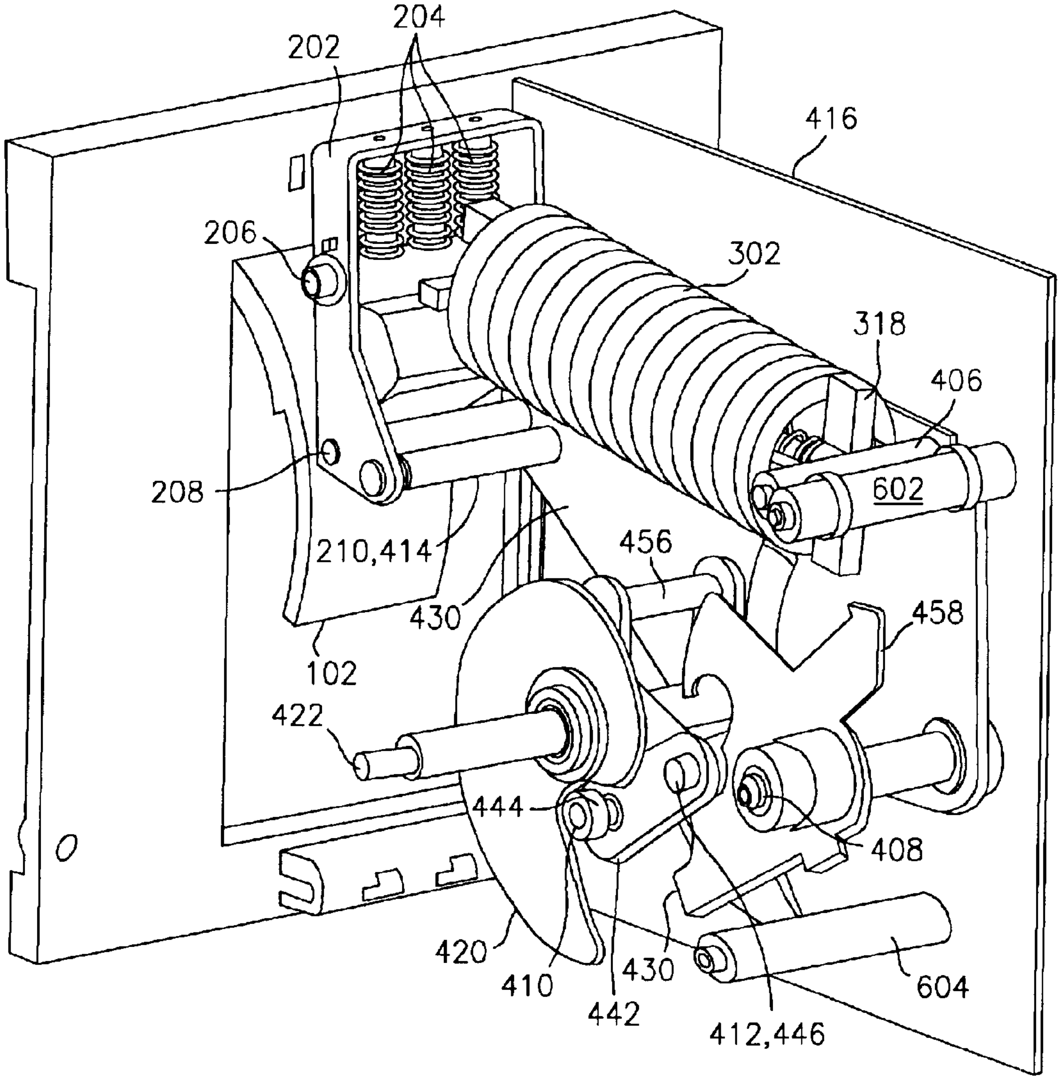
FIG. 14 is a first three dimensional view of the circuit breaker motor operator of FIG. 9.
Figure 23:
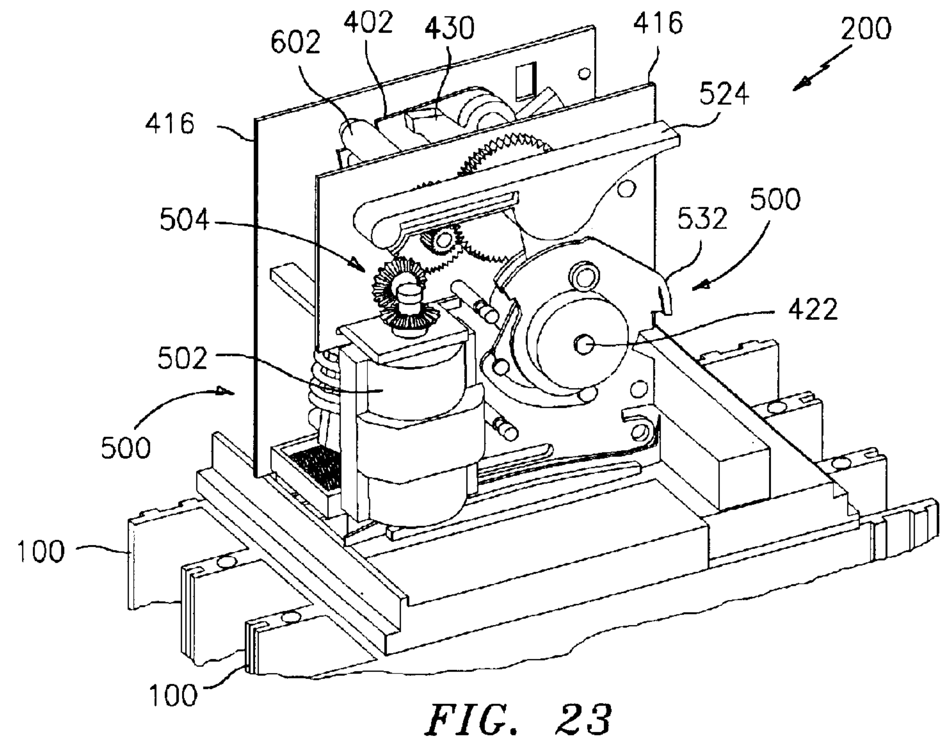
FIG. 23 is a three dimensional view of the circuit breaker motor operator of FIG. 9 including the motor drive assembly.

To move the handle from the closed position of FIG. 9 to the open position of FIG. 13, motor drive assembly 500 rotates cam 420 clockwise as viewed on cam shaft 422 such that mechanical linkage system 400 is sequentially and continuously driven through the configurations of FIGS. 10, 11 and 12. As best seen in FIG. 10, cam 420 rotates clockwise about cam shaft 422. Drive plates 402 are allowed to move due to slot 404 in drive plates 402. Roller 444 on roller axis 410 moves along first cam surface 424 of cam 420. The counterclockwise rotation of drive plates 402 drives drive plate pin 406 along open slot 316 thereby compressing main spring 302 and storing energy therein. Energy storage mechanism 300 rotates clockwise about spring assembly axis 322 and side plate pin 418. Latch plate 430, abutting brace 604, remains fixed with respect to side plates 416.

Referring now to FIG. 11, drive plate 402 rotates further counterclockwise causing drive plate pin 406 to further compress main spring 302. Cam 420 continues to rotate clockwise. Rolling pin 446 moves from second concave surface 436 of latch plate 430 partially to first concave surface 434 and latch plate 430 rotates clockwise away from brace 604. Drive plate pin 406 compresses main spring 302 further along open slot 316.

In FIG. 12, latch plate 430 rotates clockwise until rolling pin 446 rests fully within first concave surface 434. Roller 444 remains in intimate contact with first cam surface 424 as cam 420 continues to turn in the clockwise direction. In FIG. 13, cam 420 has completed its clockwise rotation and roller 444 is disengaged from cam 420. Rolling pin 446 remains in contact with first concave surface 434 of latch plate 430.

Figure 20:
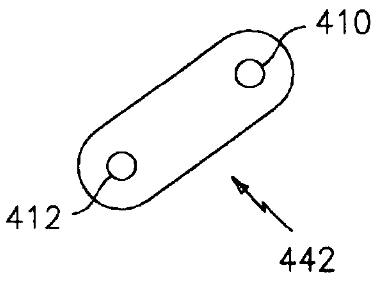
FIG. 20 is a view of the first latch link of the circuit breaker motor operator of FIG. 9.
Figure 21:
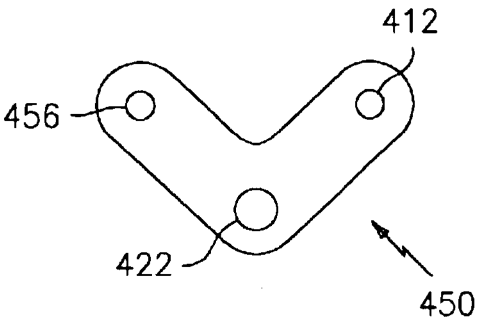
FIG. 21 is a view of the second latch link of the circuit breaker motor operator of FIG. 9.
Figure 22:
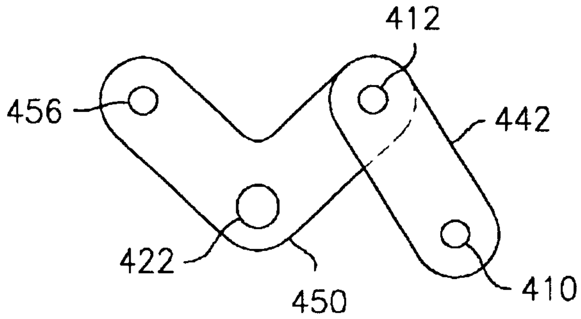
FIG. 22 is a view of the connection of the first and second latch links of the circuit breaker motor operator of FIG. 9.

Mechanical linkage system 400 thence comes to rest in the configuration of FIG. 13. In proceeding from the configuration of FIG. 9 to that of FIG. 13, main spring 302 is compressed a distance "x" by drive plate pin 406 due to counterclockwise rotation of drive plates 402 about drive plate axis 408. The compression of main spring 302 thus stores energy in main spring 302 according to the equation $$E=\frac{1}{2}k_m x^2,$$

where x is the displacement of main spring 302. Motor operator 200, energy storage mechanism 300 and mechanical linkage system 400 are held in the stable position of FIG. 13 by first latch link 442, second latch link 450 and latch plate 430. The positioning of first latch link 442 and second latch link 450 with respect to one another and with respect to latch plate 430 and cam 420 is such as to prevent the expansion of the compressed main spring 302, and thus to prevent the release of the energy stored therein. Referring to FIGS. 20–22, a pair of first latch links 442 are coupled to a pair of second latch links 450, about a link axis 412. Second latch link 450 is also rotatable about cam shaft 422. First latch links 442 and second latch links 450 are interior to and parallel with drive plates 402. A roller 444 is coupled to a roller axis 410 connecting first latch links 442 to drive plate 402. Roller 444 is rotatable about roller axis 410. Roller axis 410 is connected to drive plates 402 and roller 444 abuts, and is in intimate contact with, second cam surface 426 of cam 420. A brace 456 connects the pair of second latch links 450. An energy release mechanism, such as a latch plate 430, is rotatable about drive plate axis 408 and is in intimate contact with a rolling pin 446 rotatable about the link axis 412. Rolling pin 446 moves along a first concave surface 434 and a second concave surface 436 of latch plate 430. First concave surface 434 and second concave surface 436 of latch plate 430 are arc-like, recessed segments along the perimeter of latch plate 430 operative to receive rolling pin 446 and allow rolling pin 446 to be seated therein as latch plate 430 rotates about drive plate axis 408. Latch plate 430 includes a releasing lever 458 to which a force may be applied to rotate latch plate 430 about drive plate axis 408. In FIG. 9, latch plate 430 is also in contact with the brace 604.

Figure 26:
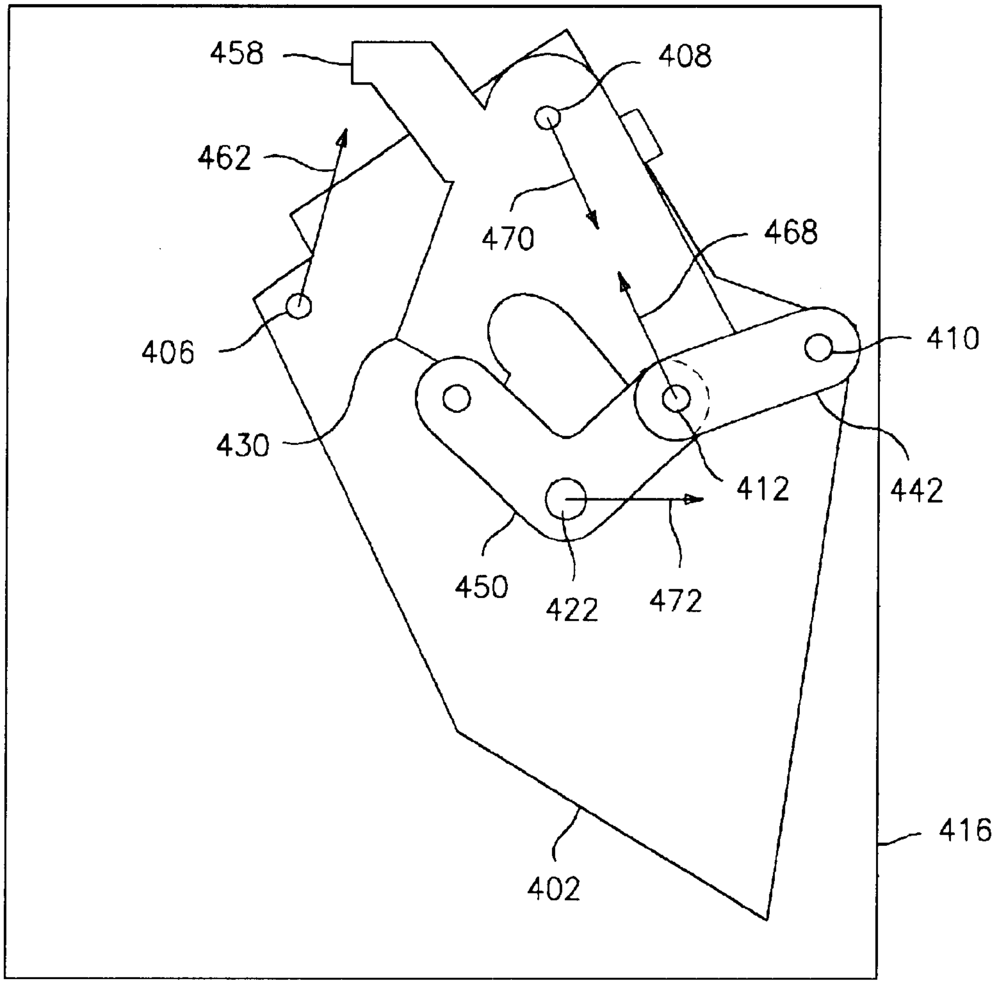
FIG. 26 is a force and moment diagram of the circuit breaker motor operator of FIG. 9.

As seen in FIG. 26, this is accomplished due to the fact that although there is a force acting along the line 462 caused by the compressed main spring 302, which tends to rotate drive plates 402 and first latch link 442 clockwise about drive plate axis 408, cam shaft 422 is fixed with respect to side plates 416 which are in turn affixed to circuit breaker 100. Thus, in the configuration FIG. 13 first latch link 442 and second latch line 450 form a rigid linkage. There is a tendency for the linkage of first latch link 442 and second latch link 450 to rotate about link axis 412 and collapse. However, this is prevented by a force acting along line 470 countering the force acting along line 468. The reaction force acting along line 472 at the cam shaft counters the moment caused by the spring force acting along line 462. Thus forces and moments acting upon motor operator 200 in the configuration of FIG. 13 are balanced and no rotation of mechanical linkage system 400 may be had.

In FIG. 13, circuit breaker 100 is in the open position. To proceed from the configuration of FIG. 13 and return to the configuration of FIG. 9 (i.e., electrical contacts closed), a force is applied to latch plate 430 on latch plate lever 458 at 460. The application of this force acts so as to rotate latch plate 430 counterclockwise about drive plate axis 408 and allow rolling pin 446 to move from first concave surface 434 as in FIG. 13 to second concave surface 436 as in FIG. 9. This action releases the energy stored in main spring 302 and the force acting on drive plate pin 406 causes drive plate 402 to rotate clockwise about drive plate axis 408. The clockwise rotation of drive plate 402 applies a force to circuit breaker handle 102 at second retaining bar 208 throwing circuit breaker handle 102 leftward, with main spring 302, latch plate 430 and mechanical linkage system 400 coming to rest in the position of FIG. 9.

Figure 25:
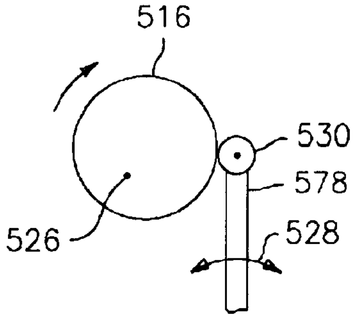
FIG. 25 is a view of the ratcheting mechanism of the motor drive assembly of the circuit breaker motor operator of FIG. 9.

Referring to FIG. 25, motor drive assembly 500 is shown engaged to motor operator 200, energy storage mechanism 300 and mechanical linkage system 400. Motor drive assembly 500 comprises a motor 502 geared to a gear train 504. Gear train 504 comprises a plurality of gears 506, 508, 510, 512, 514. One of the gears 514 of gear train 504 is rotatable about an axis 526 and is connected to a disc 516 at the axis 516. Disc 516 is rotatable about axis 526. However, axis 526 is displaced from the center of disc 516. Thus, when disc 516 rotates due to the action of motor 502 and gear train 504, disc 516 acts in a cam-like manner providing eccentric rotation of disc 516 about axis 526.

Motor drive assembly 500 further comprises a unidirectional bearing 522 coupled to cam shaft 422 and a charging plate 520 connected to a ratchet lever 518. A roller 530 is rotatably connected to one end of ratchet lever 518 and rests against disc 516 (FIG. 26). Thus, as disc 516 rotates about axis 526, ratchet lever 518 toggles back and forth as seen at 528 in FIG. 26. This back and forth action ratchets the unidirectional bearing 522 a prescribed angular displacement, θ, about the cam shaft 422 which in turn ratchets cam 420 by a like angular displacement. Referring to FIG. 24, motor drive assembly 500 further comprises a manual handle 524 coupled to unidirectional bearing 522 whereby unidirectional bearing 522, and thus cam 420, may be manually ratcheted by repeatedly depressing manual handle 524.

The method and system of an exemplary embodiment stores energy in one or more springs 302 which are driven to compression by at least one drive plate 402 during rotation of at least one recharging cam 420 mounted on a common shaft 422. The drive plate is hinged between two side plates 416 of the energy storage mechanism and there is at least one roller follower 444 mounted on the drive plate which cooperates with the recharging cam during the charging cycle. The circuit breaker handle is actuated by the stored energy system by a linear rack 202 coupled to the drive plate. The drive plate is also connected to at least one compression spring 302 in which the energy is stored. The stored energy mechanism is mounted in front of the breaker cover 100 and is secured to the cover by screws.

The recharging cam 420 is driven in rotation about its axis by a motor 502 connected to one end of the shaft by a reducing gear train 504 and a unidirectional clutch bearing assembly 522 in the auto mode and by a manual handle 524 connected to the same charging plate 520 in the manual mode.

At the end of the charging cycle the recharging cam 420 disengages completely from the drive plate 420 and the drive plate 402 is latched in the charged state by a latch plate 430 and the latch links. The stored energy is releases by the actuation of a closing solenoid trip coil in the auto mode, activated by a solenoid, and by an ON pushbutton in the manual mode on the latch plate which pushes it in rotation about its axis setting free the drive plate to rotate about the hinge to its initial position. The advantage of such a system is that because of the complete disengagement of the recharging cam and the drive plate, there is no resistance offered by the charging system when the drive plate is released by the delatching of the latch plate. This ensures minimum wasteage of stored energy while closing the breaker, less wear on the recharging cam and roller follower. There is also much lower closing time of the breaker. Thus, the drive plate holding the stored energy required to close the breaker is disengaged from the recharging cam and shaft used for charging, thus allowing for the quick closing of the breaker using a minimum signal power and with high reliability. The system minimizes the stored energy required for closing the breaker mechanism and reduces the closing time, thereby optimizing the mechanism size and cost.

At the end of charging cycle, the control cam mounted on the common shaft pushes the drive lever in rotation about its axis and the drive lever, in turn, pushes the charging plate away from the eccentric charging gear, thereby disconnecting the motor from the kinematic link and allowing free rotation of the motor. During discharge of the main spring the control cam allows the drive lever to come back to its normal position by a bias spring and hence the charging plate is connected again to the eccentric charging gear to complete the kinematic link for a fresh charging cycle.

In motor operator, motor power it is disengaged from the charging mechanism by direct cam action, thereby eliminating excessive stress on the charging mechanism and avoiding overloading the motor. The cam assembly achieves this using a few mechanical components and therefore, decreases the cost of the motor operator and enhances its longevity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An operating mechanism for a circuit interrupter mechanism, comprising:

a holder assembly being configured, dimensioned and positioned to receive a portion of an operating handle of said circuit interrupter mechanism;

a drive plate being mounted to a support structure of said operating mechanism, said drive plate being coupled to said holder assembly and said drive plate being adapted to manipulate said holder assembly between a first position and a second position, said first position corresponding to a closed position of said circuit interrupter mechanism and said second position corresponding to an open position of said circuit interrupt mechanism; and an energy storage mechanism for assuming a plurality of states, each state having a prescribed amount of energy stored in said energy storage mechanism, said energy storage mechanism providing an urging force to said drive plate when said holder assembly is in said first position, said urging force causing said holder assembly to travel from said first position to said second position when said urging force is released by said operating mechanism, wherein said energy storage mechanism further comprises:

i) a first elastic member;

ii) a first fixture having a plurality of slots therein, said first fixture positioned in said first elastic member;

iii) a second fixture having a plurality of members defining an aperture; and a second elastic member engaged to said second fixture and positioned within said aperture, wherein said second fixture is engaged with said first fixture.

2. The operating mechanism as in claim 1, wherein said energy storage system further comprises a flange affixed to said first fixture.

3. The operating mechanism as in claim 1, wherein said energy storage system further comprises a locking member for securing said first elastic member between said locking member and said flange.

4. The operating mechanism as in claim 1, wherein said second fixture is operative to move a prescribed distance relative to said first fixture.

5. The operating mechanism as in claim 1, wherein said first elastic member comprises a spring having a first spring constant.

6. The operating mechanism as in claim 4, wherein said second elastic member comprises a spring having a second spring constant less than said first spring constant.

7. The operating mechanism as in claim 1, wherein said plurality of slots includes a receptacle in one end of said first fixture for receiving a member about which said energy storage mechanism is rotatable.

8. The operating mechanism as in claim 7, wherein said energy storage mechanism is capable of moving free from said member after having moved said prescribed distance.

9. An operating mechanism for a circuit interrupter mechanism, comprising:

a holder assembly being configured, dimensioned and positioned to receive a portion of an operating handle of said circuit interrupter mechanism, said holder assembly comprises:

i) a carriage;

ii) a retaining bar, said retaining bar being rotatably mounted to said carriage; and iii) a plurality of springs being secured to said retaining bar at one end and said carriage at the opposite end;

a drive plate being movably mounted to a support structure of said operating mechanism, said drive plate being coupled to said holder assembly and said drive plate being adapted to manipulate said holder assembly between a first position and a second position, said first position corresponding to a closed position of said circuit interrupter mechanism and said second position corresponding to an open position of said circuit interrupt mechanism; and an energy storage mechanism for assuming a plurality of states, each state having a prescribed amount of energy stored in said energy storage mechanism, said energy storage mechanism providing an urging force to said drive plate when said holder assembly is in said first position, said urging force causing said holder assembly to travel from said first position to said second position when said urging force is released by said operating mechanism;

a mechanical linkage system coupled to said energy storage mechanism and to said drive plate wherein said carriage is designed to assume a plurality of positions corresponding to each of said plurality of states of said energy storage mechanism, said mechanical linkage system comprises:

i) a cam rotatable about a cam shaft, said cam shaft being coupled to a motor drive assembly;

ii) a pair of side plates;

iii) a pair of drive plates rotatably secured to said side plate for movement about a drive plate axis, each of said pair of drive plates include an elongated opening for receiving a portion of said cam shaft, said drive plates are positioned in between said pair of side plates;

iv) a latch system being configured, dimensioned and positioned to retain said energy storage mechanism in a stable position;

v) a drive plate pin connected at one end to one said pair of drive plates and coupled to said energy storage mechanism at the other end; and vi) a connecting rod coupling said pair of drive plates; and an energy release mechanism coupled to said mechanical linkage system for releasing the energy stored in said energy storage mechanism.

10. The operating mechanism of claim 9, wherein said mechanical linkage system is coupled to said energy storage mechanism, wherein said mechanical linkage system responds to actions of said motor drive assembly.

11. The operating mechanism of claim 10, wherein said motor drive assembly is operative to disengage or re-engage a set of circuit breaker contacts by moving said operating handle.

12. The operating mechanism as in claim 9, wherein said cam has have a concave surface and a convex surface.

13. The operating mechanism as in claim 9, wherein said cam shaft connects each of said pair of drive plates and is supported by said pair of side plates.

14. The operating mechanism as in claim 9, wherein said motor drive assembly rotates said cam in a first direction about said cam shaft causing a counterclockwise rotation of said pair of drive plates in a second direction being opposite to said first direction.

15. The operating mechanism as in claim 9, wherein said rotation of said drive plates causes said drive pin to move against said storage mechanism, said drive pin compresses said elastic member of said energy storage mechanism.

16. The operating mechanism as in claim 15, wherein said storage mechanism rotates in the same direction as said cam about a spring assembly axis and a side plate pin.

17. The operating mechanism as in claim 9, wherein said latch system includes a pair of first latch links coupled to a pair of second latch links about a link axis and a latch plate.

18. The operating mechanism as in claim 17, wherein said latch plate rotatably turns until a first concave surface of said latch plate is in intimate contact with a roller pin, said roller pin remains in intimate contact with said first concave surface of said latch plate until said roller pin disengages from said cam.

19. The operating mechanism as in claim 18, wherein said roller pin disengages from said cam when said cam finishes one clockwise rotation.

20. The operating mechanism as in claim 17, wherein said first latch link pair is coupled to said second latch link pair about a rotatable axis, said second latch link pair is also rotatably coupled to said cam shaft.

21. The operating mechanism as in claim 17, wherein said first pair of latch links are coupled to said pair of drive plates by said roller pin.

22. The operating mechanism as in claim 17, wherein said latch plate is operative to release the energy stored in said energy storage system, said latch plate is rotatively coupled to said drive plate axis and is in intimate contact with said rolling pin.

23. The operating mechanism as in claim 22, wherein said latch plate includes a releasing lever, said releasing lever being configured, dimensioned and positioned to rotate said latch plate about said drive plate axis.

* * * * *